(12) United States Patent  
Nakai

(10) Patent No.: US 11,343,389 B2
(45) Date of Patent: *May 24, 2022

(54) WRITING IPV4 OR IPV6 INFORMATION INTO AN NFC TAG ATTACHED TO AN IMAGE FORMING APPARATUS

(71) Applicant: CANON KABUSHIKI KAISHA, Tokyo (JP)

(72) Inventor: Hironobu Nakai, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/024,492

(22) Filed: Sep. 17, 2020

(65) Prior Publication Data

US 2021/0006668 A1    Jan. 7, 2021

Related U.S. Application Data

(63) Continuation of application No. 15/052,112, filed on Feb. 24, 2016, now Pat. No. 10,911,613.

(30) Foreign Application Priority Data

Feb. 26, 2015  (JP) .............................. JP2015-037434

(51) Int. Cl.
*G06F 3/12*  (2006.01)
*H04W 4/80*  (2018.01)
*H04L 29/12*  (2006.01)
*H04N 1/00*  (2006.01)
*H04L 61/5007*  (2022.01)
*H04L 61/5014*  (2022.01)
*H04L 61/5038*  (2022.01)
*H04L 101/659*  (2022.01)

(52) U.S. Cl.
CPC ..... *H04N 1/00307* (2013.01); *H04L 61/2007* (2013.01); *H04L 61/2015* (2013.01); *H04L 61/2038* (2013.01); *H04L 61/6059* (2013.01); *H04W 4/80* (2018.02)

(58) Field of Classification Search
None
See application file for complete search history.

(56) References Cited

U.S. PATENT DOCUMENTS

2015/0038086 A1* 2/2015 Kim .................. H04L 63/08
                                                                    455/41.3

* cited by examiner

*Primary Examiner* — Eric A. Rust
(74) *Attorney, Agent, or Firm* — Canon U.S.A., Inc. I.P. Division

(57) ABSTRACT

When a plurality of types of IP addresses is enabled in an information processing apparatus, the information processing apparatus selects an Internet Protocol (IP) address to be written to a near field communication (NFC) tag. Then, the information processing apparatus generates tag information based on the selected IP address, and writes the generated tag information to the NFC tag.

15 Claims, 13 Drawing Sheets

SETTING SCREEN 400

SETTING SCREEN 400

SETTING SCREEN 410

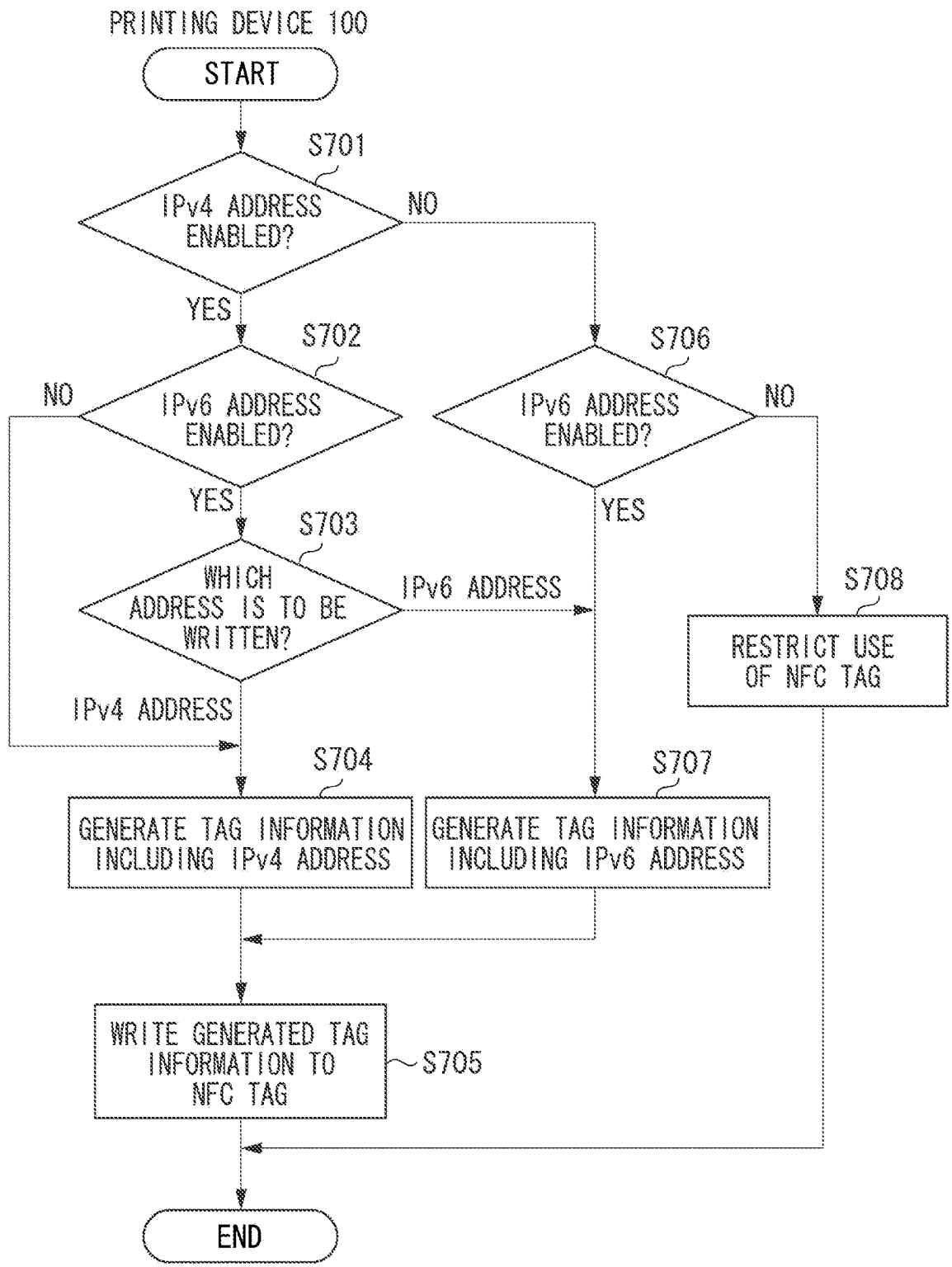

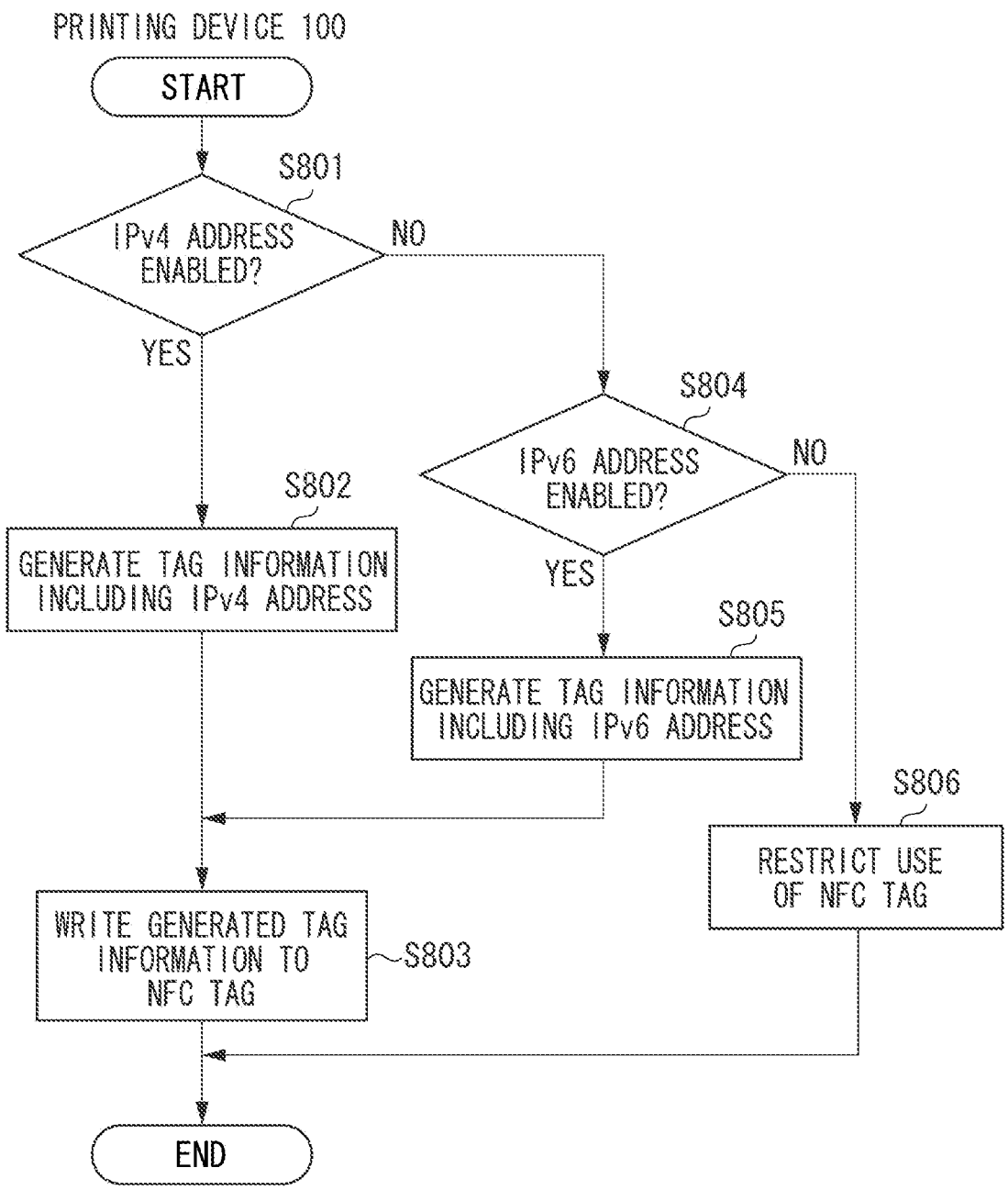

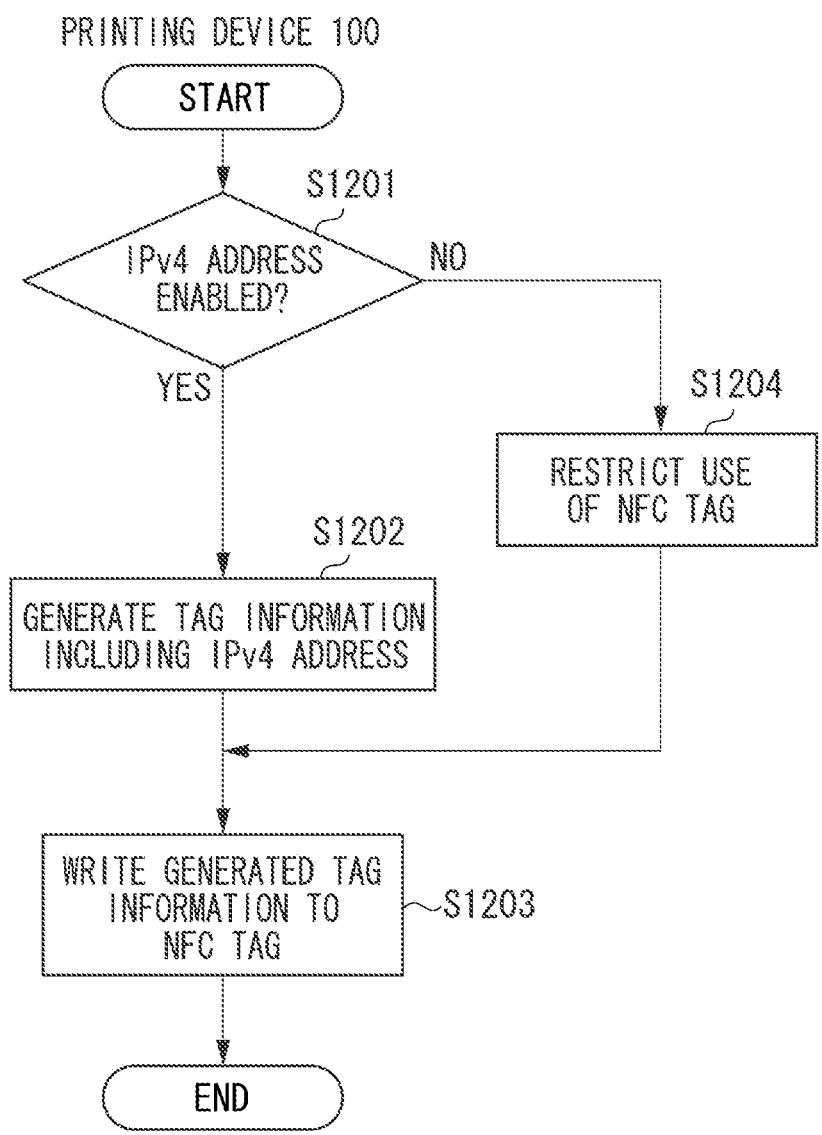

WRITING IPV4 OR IPV6 INFORMATION INTO AN NFC TAG ATTACHED TO AN IMAGE FORMING APPARATUS

CROSS-REFERENCE TO RELATED APPLICATIONS

The present application is a continuation of U.S. patent application Ser. No. 15/052,112, filed on Feb. 24, 2016, which claims priority from Japanese Patent Application No. 2015-037434 filed Feb. 26, 2015, which are hereby incorporated by reference herein in their entireties.

BACKGROUND

Field

Aspects of the present invention generally relate to an information processing apparatus including a near field communication (NFC) tag.

Description of the Related Art

Mobile terminals, such as smartphones and tablet personal computers (PCs), have a wireless communication function. For example, the wireless communication function is used in such a manner that a picture or an electronic document stored in the mobile terminal is transmitted to a printing device via wireless communication, and then printed by the printing device.

When the mobile terminal executes wireless communication with an information processing apparatus, such as a printing device, the mobile terminal needs to connect to an access point to establish the wireless communication. One known procedure for establishing the wireless communication includes a handover via NFC (Japanese Patent Application Laid-Open No. 2013-157736). The handover is a method for acquiring connection information (e.g., a service set identifier (SSID) of the access point), required for executing the wireless communication, via proximity wireless communication such as the NFC, and establishing wireless communication based on the acquired connection information. With the handover, the user only needs to bring the mobile terminal close to (only needs to touch) the information processing apparatus, such as a printing device, to establish wireless communication between the mobile terminal and the information processing apparatus.

When the handover is performed via the proximity wireless communication, the connection information needs to be prepared in advance in a proximity wireless communication tag (e.g., an NFC tag) of an information processing apparatus such as a printing device. The connection information in the proximity wireless communication tag includes the SSID of an access point and an Internet Protocol (IP) address of the information processing apparatus.

The IP address of the information processing apparatus includes a plurality of types of IP addresses such as an Internet Protocol version 4 (IPv4) address and an Internet Protocol version 6 (IPv6) address. With the technique discussed in Japanese Patent Application Laid-Open No. 2013-157736, appropriate information cannot be written to the proximity wireless communication tag, taking into consideration the plurality of types of IP addresses.

SUMMARY

In view of the above, aspects of the present invention are generally directed to a technique for writing appropriate information to a proximity wireless communication tag based on a type of an IP address set in an information processing apparatus.

An information processing apparatus according to an aspect of the present invention includes a near field communication (NFC) tag, a generation unit configured to generate tag information to be written into the NFC tag based on an Internet Protocol (IP) address setting set in the information processing apparatus, and a writing unit configured to write the tag information generated by the generation unit into the NFC tag. The tag information written into the NFC tag readable by an external device via NFC, while the IP address setting includes an Internet Protocol version 4 (IPv4) address setting and an Internet Protocol version 6 (IPv6) address setting.

Further features of aspects of the present invention will become apparent from the following description of exemplary embodiments with reference to the attached drawings.

BRIEF DESCRIPTION OF THE DRAWINGS

FIG. 7 is a flowchart illustrating processing according to a first exemplary embodiment.

FIG. 8 is a flowchart illustrating processing according to a second exemplary embodiment.

FIG. 12 is a flowchart illustrating processing according to a fifth exemplary embodiment.

DESCRIPTION OF THE EMBODIMENTS

Exemplary embodiments of the present invention are described below with reference to the drawings. The exemplary embodiments described below are not intended to limit the scope of aspects of the invention according to claims, and not all the combinations of features of the exemplary embodiments, are essential to solutions for the aspects of the present invention.

Figure 1:
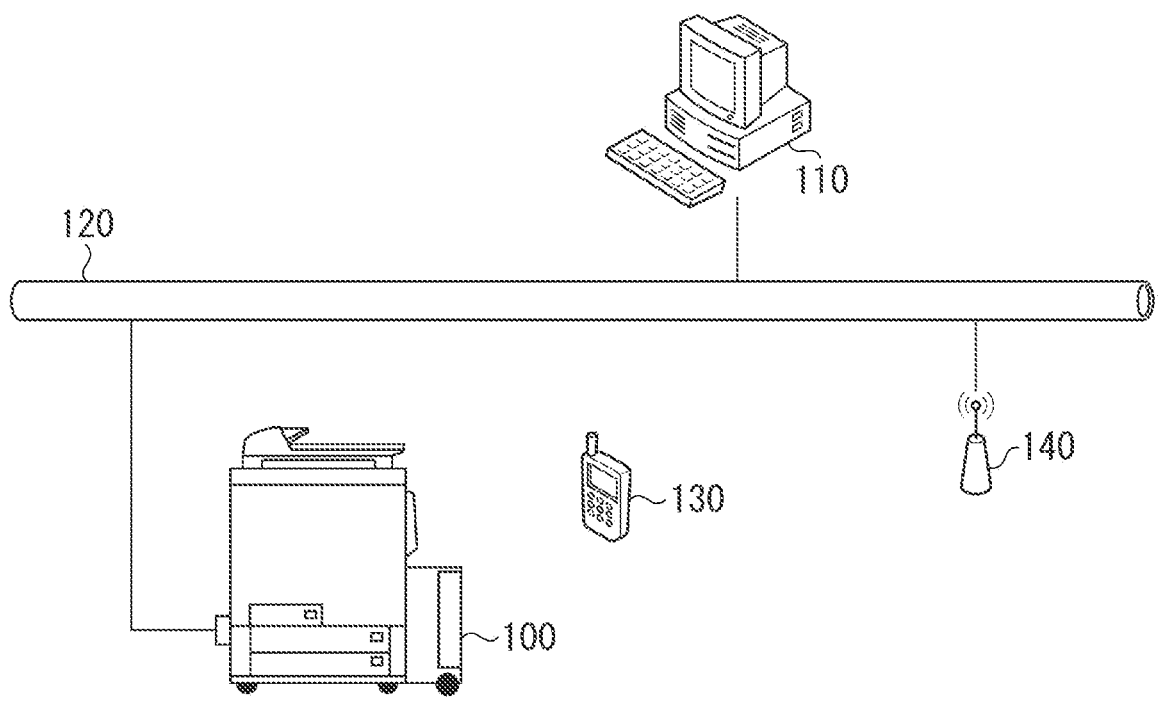
FIG. 1 is a diagram illustrating a configuration of a print system.

A first exemplary embodiment of the present invention is described below. First, a configuration of a print system according to the present exemplary embodiment is described with reference to FIG. 1. A printing device 100 is connected to a network 120, and can communicate with an external device such as a personal computer (PC) 110 and a mobile terminal 130 through the network 120. The PC 110 transmits print data to the printing device 100 through the network 120. The mobile terminal 130 transmits print data to the printing device 100 through an access point 140. The printing device 100 that has received the print data can execute print processing based on the received print data.

The printing device 100 can execute proximity wireless communication based on near field communication (NFC). When a user brings the mobile terminal 130 close to the printing device 100, the mobile terminal 130 acquires tag information (information that has been written in a NFC tag) from the NFC tag of the printing device 100 via the NFC. For example, the tag information includes an Internet Protocol (IP) address of the printing device 100 and a service set identifier (SSID) of the access point 140. The mobile terminal 130 that has acquired the tag information connects to the access point 140 via wireless communication such as wireless local area network (LAN), and transmits the print data to the printing device 100 through the access point 140. In this manner, the user of the mobile terminal 130 only needs a simple operation of bringing the mobile terminal 130 close to the printing device 100 to acquire the information required for transmitting the print data to the printing device 100.

Figure 2:
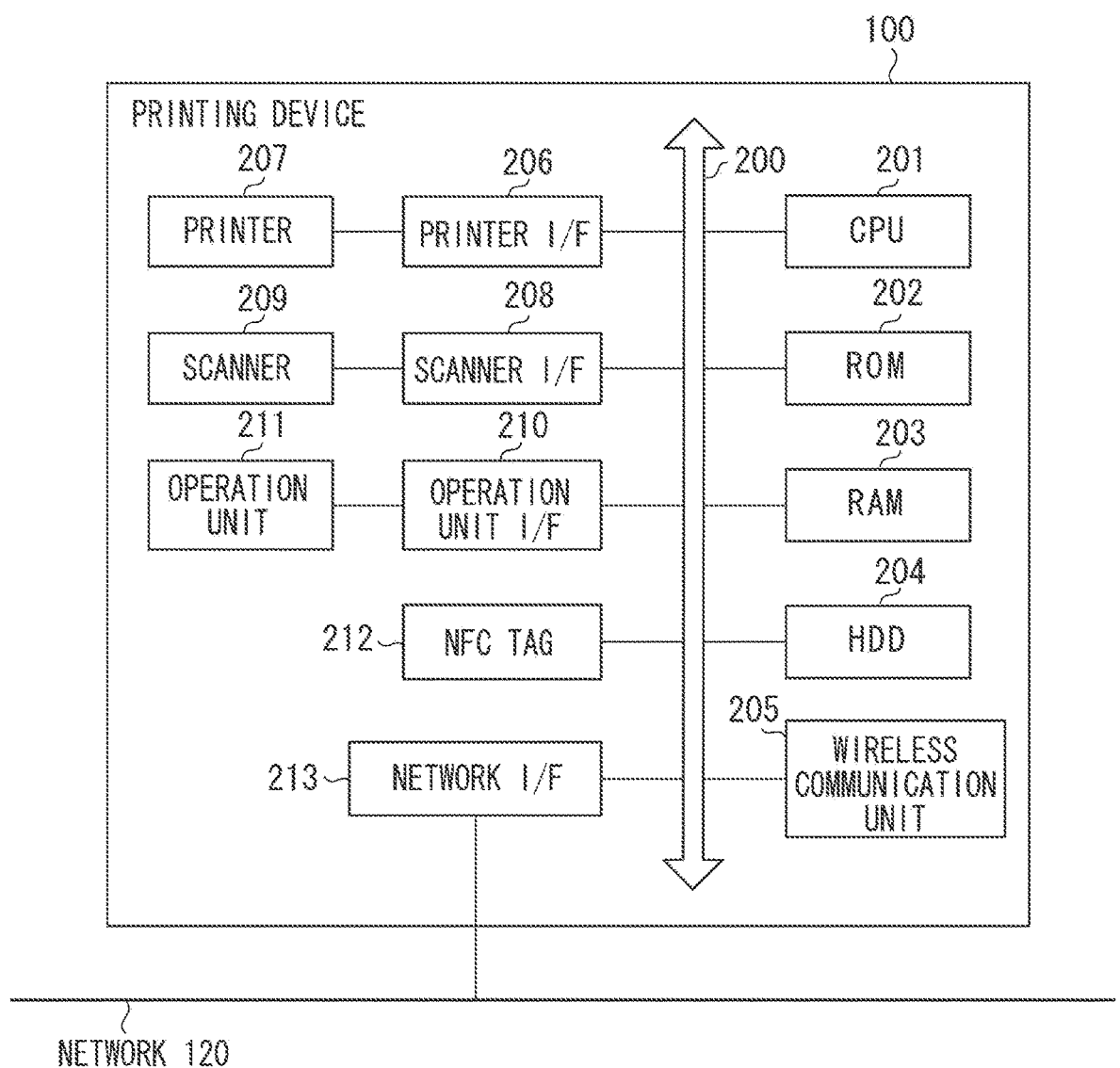
FIG. 2 is a block diagram illustrating a configuration of a printing device.

Next, a configuration of the printing device 100 is described with reference to FIG. 2. The printing device 100, which is assumed to be a multifunction peripheral (MFP) in the present exemplary embodiment, may be a printing device having no scanner function.

A central processing unit (CPU) 201 reads out a control program stored in a read only memory (ROM) 202, and executes various processing for controlling an operation of the printing device 100. The CPU 201 is connected to other units through a bus 200. The ROM 202 stores the control program. A random access memory (RAM) 203 is used as a main memory and a temporary storage area such as a work area for the CPU 201. A hard disk drive (HDD) 204 stores various data such as print data and scan images.

In the printing device 100, a single CPU 201 executes each process in a flowchart described below. However, another configuration may be employed. For example, a plurality of CPUs may work together to execute each process in the flowchart described below. The processing illustrated in the flowcharts may be partially executed by a hardware circuit.

A wireless communication unit 205 has a wireless LAN function, and executes wireless communication with the access point 140. The wireless communication unit 205 can operate in an access point mode. When the wireless communication unit 205 operates in the access point mode, direct wireless communication can be established between the mobile terminal 130 and the printing device 100 with the wireless communication unit 205 serving as the access point. The direct wireless communication can be established between the mobile terminal 130 and the printing device 100 not only with the access point mode, but can also be established with another wireless system such as Wi-Fi Direct (registered trademark).

An NFC tag 212 executes proximity wireless communication with the mobile terminal 130 based on the NFC. The NFC tag 212 is an example of a proximity wireless communication tag from which an external device can read information via the proximity wireless communication.

Figure 3:
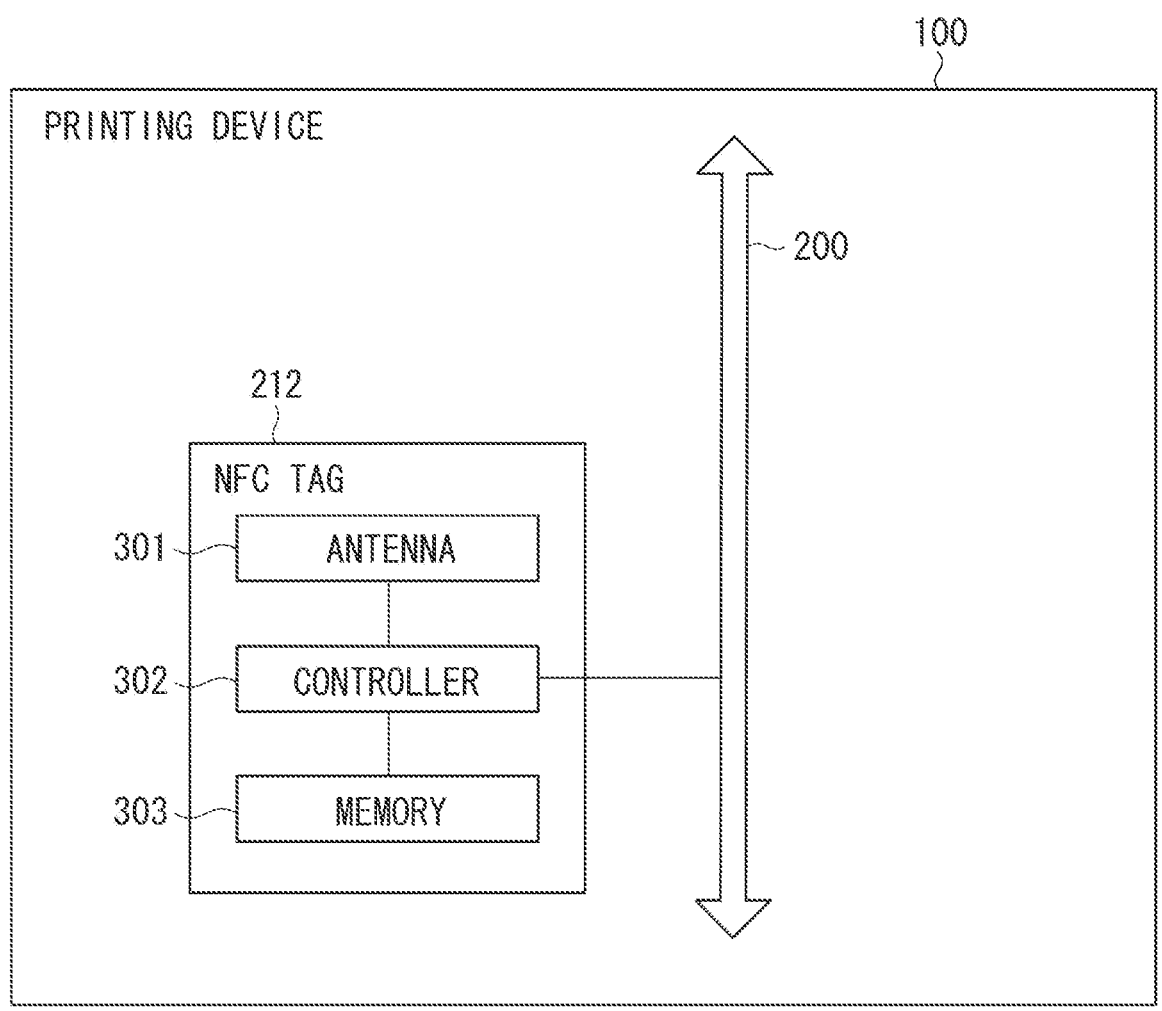
FIG. 3 is a block diagram illustrating a configuration of a near field communication (NFC) tag.

A configuration of the NFC tag 212 is described in detail with reference to FIG. 3. The NFC tag 212 includes an antenna 301, a controller 302, and a memory 303.

The antenna 301 is an antenna for executing the wireless communication based on the NFC with the external device. The controller 302 is connected to the bus 200, and controls an operation of the antenna 301 and writes tag information into the memory 303, according to an instruction from the CPU 201. The memory 303 stores therein the tag information written by the controller 302. The tag information stored in the memory 303 is readable by the mobile terminal 130 via the NFC.

Referring back to FIG. 2, a printer I/F 206 connects a printer 207 with the bus 200. The printer 207 executes print processing on a sheet, based on print data received from the external device, a scan image generated by a scanner 209, and the like.

A scanner I/F 208 connects the scanner 209 with the bus 200. The scanner 209 reads an original and generates a scan image. The scan image generated by the scanner 209 is printed by the printer 207 or stored in the HDD 204.

An operation unit I/F 210 connects an operation unit 211 with the bus 200. The operation unit 211 includes a liquid crystal display, having a touch panel function, and a keyboard, and displays various operation screens. The user can input an instruction and information to the printing device 100 via the operation unit 211.

A network I/F 213 is connected to the network 120, and executes communication with the external device on the network 120. The network I/F 213 receives print data transmitted from the external device, and then the printer 207 executes the print processing based on the received print data.

The printing device 100 is an example of an information processing apparatus including the NFC tag, and thus an information processing apparatus to which aspects of the present invention can be applied is not limited to the printing device 100. More specifically, aspects of the present invention can be applied to a digital camera, a video camera, and a mobile terminal, such as a smartphone and a tablet personal computer (PC), including a proximity wireless communication tag such as the NFC tag.

Next, an IP address setting in the printing device 100 is described. In the present exemplary embodiment, either one of an Internet Protocol version 4 (IPv4) address and an Internet Protocol version 6 (IPv6) address or both can be set in the printing device 100.

Figure 4A:
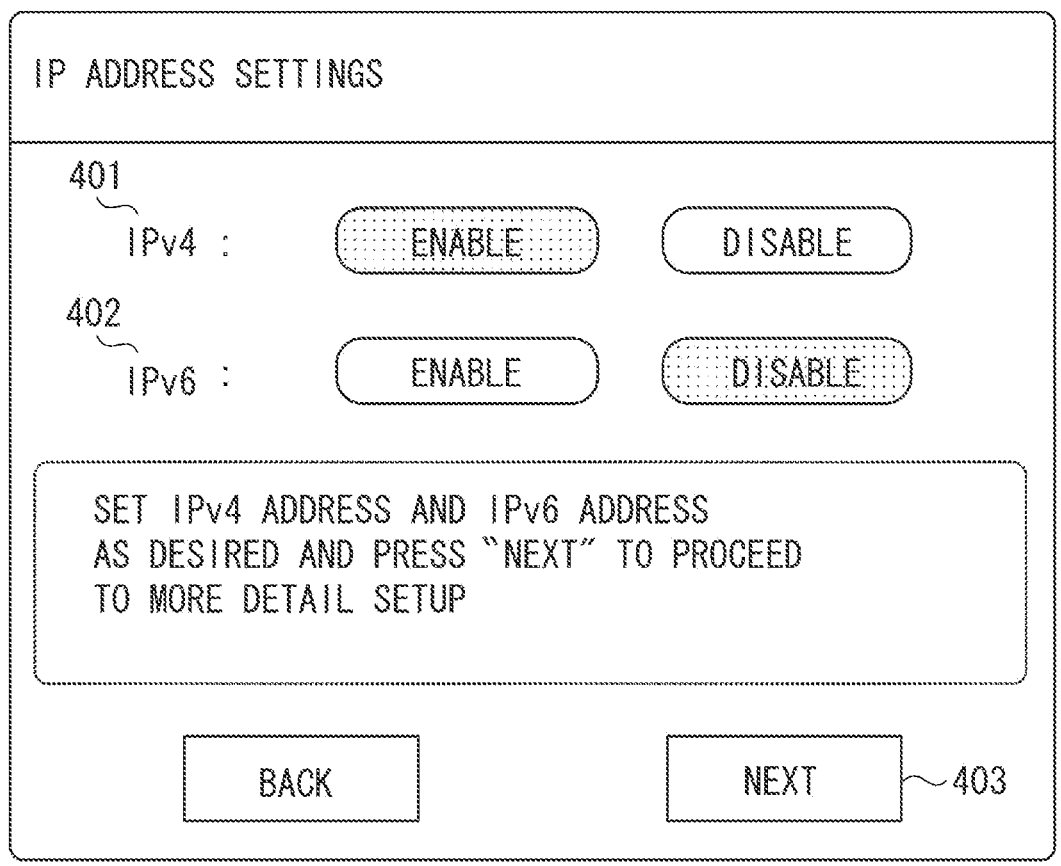
FIGS. 4A and 4B are diagrams each illustrating a setting screen with which an Internet Protocol (IP) addresses related setting is performed.

A setting screen 400 illustrated in FIG. 4A, with which the IP address is set in the printing device 100, is displayed by the operation unit 211 according to a user operation. An item 401 is used for selecting whether the IPv4 address is used. In the item 401, the user can select either "enable" or "disable". When "enable" is selected, the IPv4 address, which is set via a setting screen 410 (described below), is enabled in the printing device 100. An item 402 is an item used for selecting whether to use the IPv6 address, and the user can select either one of "enable" and "disable" through a touch operation for example. When "enable" is selected, the IPv6 address set via the setting screen 410 (described below) is enabled in the printing device 100.

The printing device 100 can operate in a state where either one of the IPv4 address and the IPv6 address is enabled, and in a state where both the IPv4 address and the IPv6 address are enabled. When "disable" is set for both the IPv4 address and the IPv6 address via the setting screen 400, the printing device 100 cannot execute transmission control protocol (TCP)/IP communication. Accordingly, it is desirable that at least one of the IPv4 address and the IPv6 address is enabled in the printing device 100.

Figure 4B:
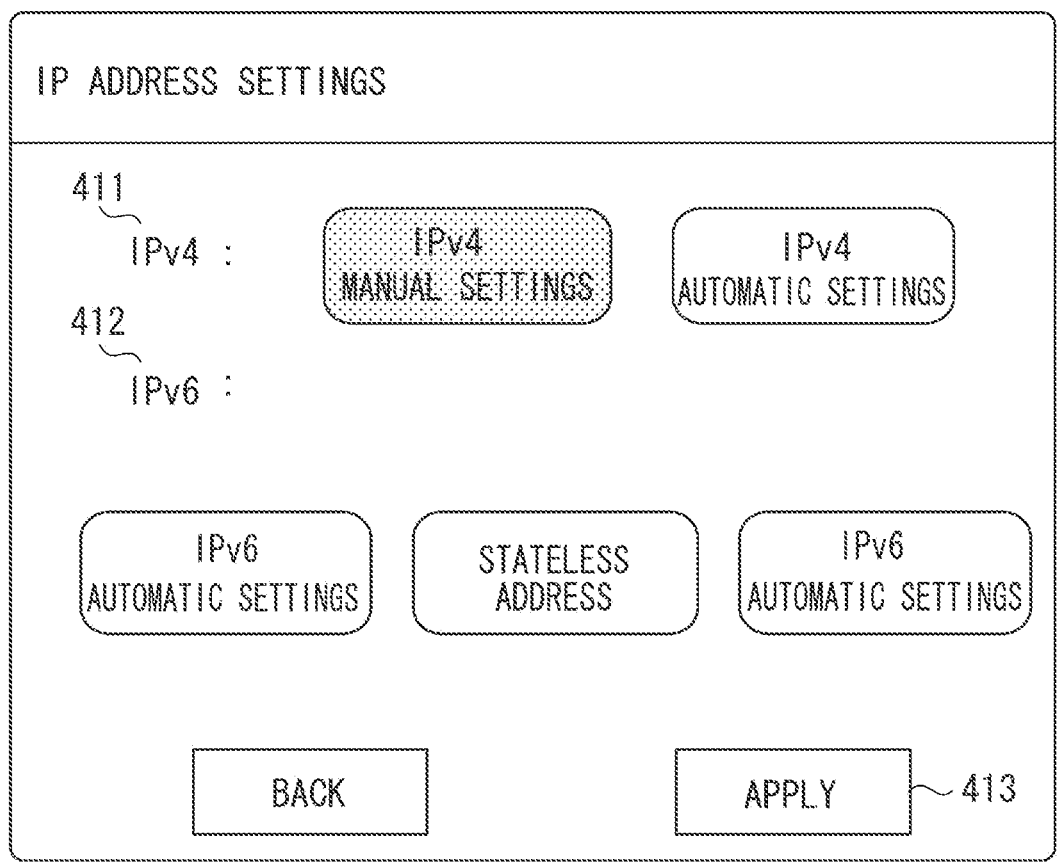

When the user selects a button 403 on the setting screen 400, the operation unit 211 displays the setting screen 410 illustrated in FIG. 4B. The setting screen 410 is a screen for determining the IPv4 address and the IPv6 address to be allocated to the printing device 100. When the user selects a button 413 on the setting screen 410, setting results performed on the setting screen 400 and the setting screen 410 are stored in a memory, such as the HDD 204, as device settings.

In an item 411, the user can select either one of "IPv4 manual settings" and "IPv4 automatic settings" as a way for determining the IPv4 address. When the user selects "IPv4 manual settings", an address input screen (not illustrated) is displayed and the user inputs a desired IPv4 address. When the user then selects the button 413, the IPv4 address, input by the user, is enabled in the printing device 100.

When the user selects "IPv4 automatic settings", the IPv4 address is allocated to the printing device 100 from an external device such as a dynamic host configuration protocol (DHCP) server. When the user then selects the button 413, the IPv4 address, allocated to the printing device 100 from the external device such as the DHCP server, is enabled in the printing device 100.

When "enable" is set for the IPv6 address on the setting screen 400, a link local address is automatically generated by the printing device 100 and is enabled in the printing device 100. When the IPv6 address is used, an IPv6 address other than the link local address can be set in the printing device 100. An item 412 on the setting screen 410 is used when an IPv6 address, other than the link local address, is to be set in the printing device 100.

When the user selects the "IPv6 manual settings", an address input screen (not illustrated) is displayed and the user inputs a desired IPv6 address. When the user then selects the button 413, the IPv6 address input by the user is enabled in the printing device 100.

When "stateless address" is selected, the printing device 100 automatically generates the IPv6 address, based on a Router Advertisement (RA) packet transmitted from the router. When the user then selects the button 413, the stateless address thus automatically generated is enabled in the printing device 100.

When the user selects "IPv6 automatic settings", the IPv6 address is allocated to the printing device 100 from the external device such as the DHCP server. When the user then selects the button 413, the IPv6 address allocated from the external device such as the DHCP server is enabled in the printing device 100.

As described above, with the setting screen 400 and the setting screen 410, the user can set either one of the IPv4 address and the IPv6 address or both in the printing device 100. The printing device 100 writes the tag information into the memory 303 of the NFC tag 212. However, the memory 303 has a capacity only large enough for one of the IPv4 address and the IPv6 address to be written. Accordingly, a feature of the present exemplary embodiment is that the user sets either one of the IPv4 address and the IPv6 address to be written into the memory 303 of the NFC tag 212, when both the IPv4 address and the IPv6 address are enabled in the printing device 100.

Figure 5:
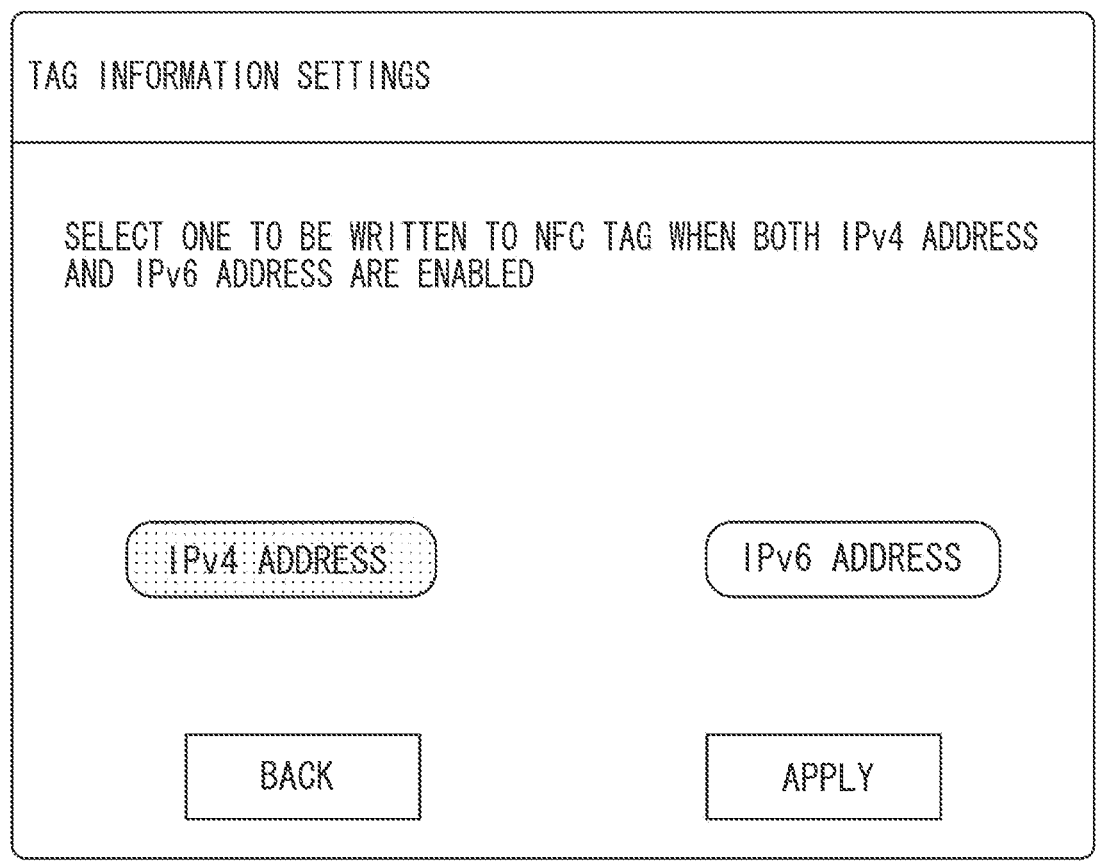
FIG. 5 is a diagram illustrating a setting screen with which tag information related setting is performed.

A setting screen 500 illustrated in FIG. 5 is a screen used by the user to select either one of the IPv4 address and the IPv6 address to be written into the memory 303 of the NFC tag 212, when both the IPv4 address and the IPv6 address are enabled in the printing device 100. The setting screen 500 is displayed by the operation unit 211 according to an operation of the user.

The user can select either one of the IPv4 address and the IPv6 address on the setting screen 500. When the user selects the IPv4 address on the setting screen 500, tag information including the IPv4 address and including no IPv6 address is written into the NFC tag 212, in a case where both the IPv4 address and the IPv6 address are enabled in the printing device 100. For example, it is desirable that the user selects the IPv4 address on the setting screen 500 in an environment with a large number of mobile terminals and applications compatible with the IPv4 address.

On the other hand, when the user selects the IPv6 address on the setting screen 500, tag information including the IPv6 address and including no IPv4 address is written into the NFC tag 212, in the case where both the IPv4 address and the IPv6 address are enabled in the printing device 100. For example, it is desirable that the user selects the IPv6 address on the setting screen 500 in an environment with a large number of mobile terminals and applications compatible with the IPv6 address.

When the user selects an apply button on the 500, the setting result on the setting screen 500 is stored in the memory, such as the HDD 204, as the device settings.

Next, a configuration of the tag information to be written in the NFC tag 212 is described with reference to FIGS. 6A and 6B. The tag information according to the present exemplary embodiment is in a format known as an NFC Data Exchange Format (NDEF) defined by the NFC forum.

Figure 6A:
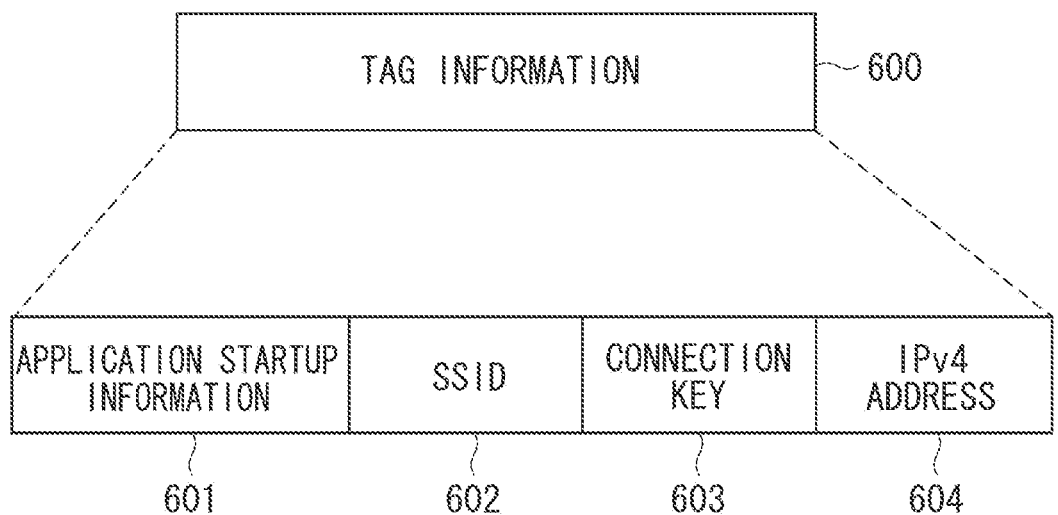
FIGS. 6A and 6B are diagrams each illustrating a configuration of the tag information.

Tag information 600 illustrated in FIG. 6A is the tag information including the IPv4 address of the printing device 100. The tag information 600 at least includes application startup information 601, an SSID 602, a connection key 603, and an IPv4 address 604.

The application startup information 601 is information for starting a predetermined application in the mobile terminal 130 that has read the tag information 600. For example, when identification information about a predetermined print application corresponding to the printing device 100 is designated, the predetermined print application can start in the mobile terminal 130 that has read the tag information 600.

The SSID 602 is an SSID of the access point 140. The connection key 603 is a connection key used for connecting to the access point 140. With these pieces of information included in the tag information, the mobile terminal 130 that has read the tag information can be automatically connected to the access point 140. The SSID of the access point 140 and the connection key are registered in a memory such as the HDD 204 of the printing device 100 in advance. The printing device 100 generates the tag information 600 based on the SSID and the connection key that have been registered in advance.

The IPv4 address 604 is an IPv4 address enabled in the printing device 100. The mobile terminal 130 that has read the tag information transmits the print data to the printing device 100, with the IPv4 address representing the destination.

Figure 6B:
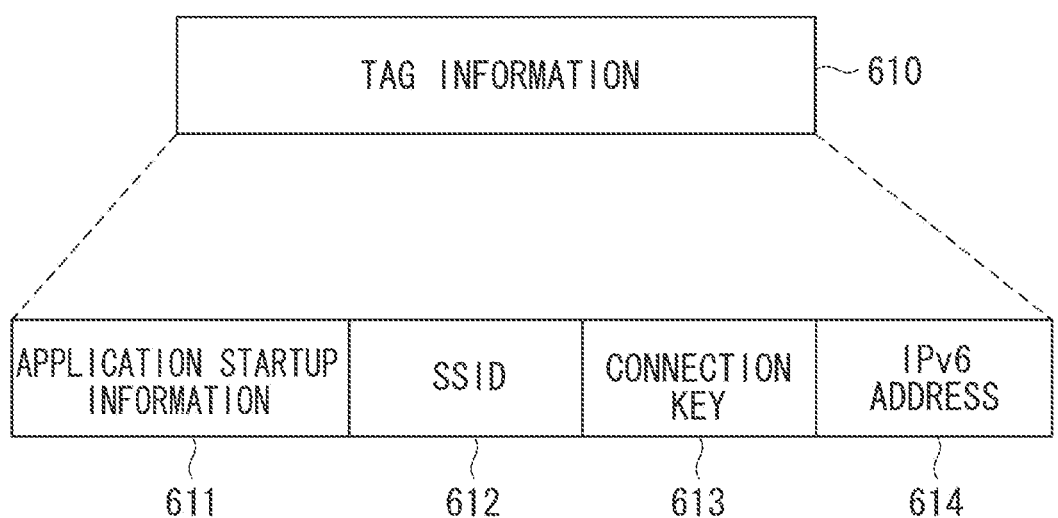

On the other hand, tag information 610 illustrated in FIG. 6B is tag information including the IPv6 address of the printing device 100. Application startup information 611, an SSID 612, and a connection key 613 are respectively similar to the application startup information 601, the SSID 602, and the connection key 603 described with reference to FIG. 6A. An IPv6 address 614 is an IPv6 address enabled in the printing device 100.

It is assumed in the present exemplary embodiment that in the printing device 100, which may operate in a state where a plurality of the IPv6 addresses are enabled, the link local address is used as the IPv6 address 614. An IPv6 address, other than the link local address, such as a stateless address may be used as the IPv6 address included in the tag information. In such a case, for example, a selection screen in which the IPv6 address to be included in the tag information is selected by the user from a plurality of IPv6 addresses may be displayed, and the IPv6 address having been selected in the selection screen may be included in the tag information.

Next, processing in which the printing device 100 generates the tag information and writes the generated tag information into the NFC tag 212 is described with reference to a flowchart illustrated in FIG. 7. Each step in the flowchart illustrated in FIG. 7 is executed by the CPU 201 loading the control program stored in the memory, such as the ROM 202, onto the RAM 203 and executing the control program. The processing in the flowchart illustrated in FIG. 7 is executed as initial processing executed when the printing device 100 is turned ON, or executed when the setting of the IP address, in the printing device 100, is changed via the setting screen 400 and the setting screen 410.

In step S701, the CPU 201 determines whether the IPv4 address is enabled in the printing device 100. When the CPU 201 determines that the IPv4 address is enabled in the printing device 100 (YES in step S701), the processing proceeds to step S702. On the other hand, when the CPU 201 determines that the IPv4 address is not enabled in the printing device 100 (NO in step S701), the processing proceeds to step S706.

In step S702, the CPU 201 determines whether the IPv6 address is enabled in the printing device 100. When the CPU 201 determines that the IPv6 address is enabled in the printing device 100 (YES in step S702), the processing proceeds to step S703. On the other hand, when the CPU 201 determines that the IPv6 address is not enabled in the printing device 100 (NO in step S702), the processing proceeds to step S704.

Next, step S703 is described. Processing in step S703 is executed when both the IPv4 address and the IPv6 address are enabled in the printing device 100. In step S703, the CPU 201 determines whether the IPv4 address or the IPv6 address is to be written as the tag information, by referring to the setting result, performed via the setting screen 500, stored in the memory such as the HDD 204. When the IPv4 address has been selected, as information to be included in the tag information, on the setting screen 500 (IPv4 address in step S703), the processing proceeds to step S704. On the other hand, when the IPv6 address has been selected, as information to be included in the tag information, on the setting screen 500 (IPv6 address in step S703), the processing proceeds to step S707.

Next, step S704 is described. Processing in step S704 is executed when only the IPv4 address is enabled in the printing device 100 or when both the IPv4 address and the IPv6 address are enabled and the IPv4 address has been selected as the information to be included in the tag information.

In step S704, the CPU 201 generates the tag information including the IPv4 address. The tag information generated in step S704 is the tag information 600 described with reference to FIG. 6A. Even when both the IPv4 address and the IPv6 address are enabled in the printing device 100, the tag information generated in step S704 includes no IPv6 address. When the tag information is generated, the processing proceeds to step S705. In step S705, the CPU 201 writes the tag information 600 generated in step S704 to the NFC tag 212. More specifically, the CPU 201 instructs the controller 302 to write the tag information 600 into the memory 303, and thus the controller 302 writes the tag information 600 into the memory 303.

Next, step S706 is described. In step S706, the CPU 201 determines whether the IPv6 address is enabled in the printing device 100. When the CPU 201 determines that the IPv6 address is enabled in the printing device 100 (YES in step S706), the processing proceeds to step S707. On the other hand, when the CPU 201 determines that the IPv6 address is not enabled in the printing device 100 (NO in step S706), the processing proceeds to step S708.

Next, step S707 is described. Processing in step S707 is executed when only the IPv6 address is enabled in the printing device 100 or when both the IPv4 address and the IPv6 address are enabled and the IPv6 address has been selected as the information to be included in the tag information.

In step S707, the CPU 201 generates the tag information including the IPv6 address. The tag information generated in step S707 is the tag information 610 described with reference to FIG. 6B. Even when both the IPv4 address and the IPv6 address are enabled in the printing device 100, the tag information generated in step S707 includes no IPv4 address. When the tag information is generated, the processing proceeds to step S705. In step S705, the CPU 201 writes the tag information 610 generated in step S707 into the NFC tag 212. More specifically, the CPU 201 instructs the controller 302 to write the tag information 610 into the memory 303, and thus the controller 302 writes the tag information 610 to the memory 303.

Next, step S708 is described. In step S708, the CPU 201 restricts the use of the NFC tag 212. Processing in step S708 is executed when neither the IPv4 address nor the IPv6 address is enabled in the printing device 100. In such a case, the printing device 100 cannot execute the TCP/IP communication, and thus cannot receive the print data. Accordingly, in the present exemplary embodiment, the use of the NFC tag 212 is restricted when neither the IPv4 address nor the IPv6 address is enabled in the printing device 100.

More specifically, the CPU 201 restricts the use of the NFC tag 212 by stopping the power supply to the NFC tag 212, so that the NFC tag 212 can no longer operate. In this case, nothing occurs when the user touches the NFC tag 212 with the mobile terminal 130, so that the use of the NFC tag 212 is restricted. Alternatively, the CPU 201 may restrict the use of the NFC tag 212 by writing no information to the memory 303 of the NFC tag 212 (and by deleting information that has been written). In this case, no information can be read from the NFC tag 212 when the user touches the NFC tag 212 with the mobile terminal 130, so that the use of the NFC tag 212 is restricted.

As described above, in the present exemplary embodiment, appropriate tag information can be written in the NFC tag 212 based on the type of the IP address set to the printing device 100. In particular, when a plurality of IP addresses, such as the IPv4 address and the IPv6 address, is set to the printing device 100, either one of the IPv4 address and the IPv6 address is selected, and the tag information including a selected address can be written into the NFC tag 212.

A second exemplary embodiment of the present invention is described below. In the present exemplary embodiment, a configuration in which the IPv4 address is always written into the NFC tag 212 when both the IPv4 address and the IPv6 address are enabled in the printing device 100 is described as a modified example of the first exemplary embodiment. The configuration of the printing device 100 is similar to that in the first exemplary embodiment. In the present exemplary embodiment, the printing device 100 involves no setting described with reference to the setting screen 500 illustrated in FIG. 5.

Processing in which the printing device 100 generates tag information and writes the generated tag information into the NFC tag 212 is described with reference to a flowchart illustrated in FIG. 8. Each step in the flowchart illustrated in FIG. 8 is executed by the CPU 201 loading the control program stored in the memory, such as the ROM 202, onto the RAM 203 and executing the control program. The processing illustrated in the flowchart illustrated in FIG. 8 is executed as initial processing executed when the printing device 100 is turned ON, or executed when the IP address setting in the printing device 100 is changed via the setting screen 400 and the setting screen 410.

In step S801, the CPU 201 determines whether the IPv4 address is enabled in the printing device 100. When the CPU 201 determines that the IPv4 address is enabled in the printing device 100 (YES in step S801), the processing proceeds to step S802. On the other hand, when the CPU 201 determines that the IPv4 address is not enabled in the printing device 100 (NO in step S801), the processing proceeds to step S804.

In step S802, the CPU 201 generates the tag information including the IPv4 address. The tag information generated in step S802 is the tag information 600 described with reference to FIG. 6A. In the present exemplary embodiment, also when both the IPv4 address and the IPv6 address are enabled in the printing device 100, the tag information 600 including no IPv6 address is generated in step S802. When the CPU 201 determines that the IPv4 address is enabled in step S801 (YES in step S801), the processing in step S802 is executed without the CPU 201 determining whether the IPv6 address is enabled.

Next, in step S803, the CPU 201 writes the tag information 600 generated in step S802 into the NFC tag 212.

Processing in steps S804, S805, and S806 is similar to that in steps S706, S707, and S708, and thus will not be described in detail.

In the present exemplary embodiment, the tag information 600 including the IPv4 address is written into the NFC tag 212 when only the IPv4 address is enabled in the printing device 100 or when both the IPv4 address and the IPv6 address are enabled in the printing device 100. The tag information 610 including the IPv6 address is written into the NFC tag 212 when only the IPv6 address is enabled in the printing device 100.

A third exemplary embodiment of the present invention is described below. In the present exemplary embodiment, a configuration in which the IPv6 address is always written into the NFC tag 212 when both the IPv4 address and the IPv6 address are enabled in the printing device 100 is described as a modified example of the first exemplary embodiment. The configuration of the printing device 100 is similar to that in the first exemplary embodiment. In the present exemplary embodiment, the printing device 100 involves no setting described with reference to the setting screen 500 illustrated in FIG. 5.

Figure 9:
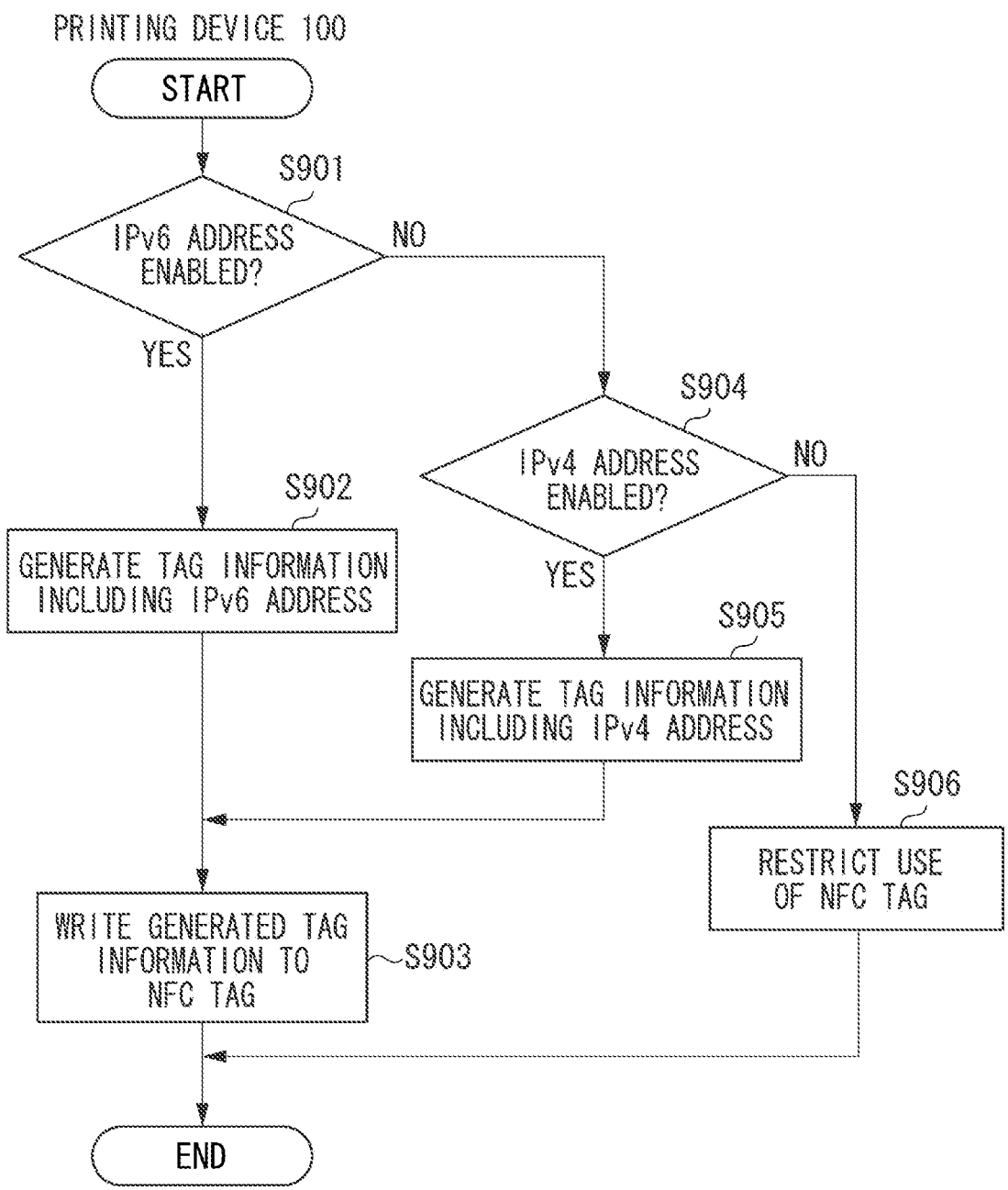
FIG. 9 is a flowchart illustrating processing according to a third exemplary embodiment.

Processing in which the printing device 100 generates tag information and writes the tag information into the NFC tag 212 is described with reference to a flowchart illustrated in FIG. 9. Each step in the flowchart illustrated in FIG. 9 is executed by the CPU 201 loading the control program stored in the memory, such as the ROM 202, onto the RAM 203 and executing the control program. The processing illustrated in the flowchart illustrated in FIG. 9 is executed as initial processing executed when the printing device 100 is turned ON, or executed when the IP address setting in the printing device 100 is changed via the setting screen 400 and the setting screen 410.

In step S901, the CPU 201 determines whether the IPv6 address is enabled in the printing device 100. When the CPU 201 determines that the IPv6 address is enabled in the printing device 100 (YES in step S901), the processing proceeds to step S902. On the other hand, when the CPU 201 determines that the IPv6 address is not enabled in the printing device 100 (NO in step S901), the processing proceeds to step S904.

In step S902, the CPU 201 generates the tag information including the IPv6 address. The tag information generated in step S902 is the tag information 610 described with reference to FIG. 6B. In the present exemplary embodiment, also when both the IPv4 address and the IPv6 address are enabled in the printing device 100, the tag information 610 including no IPv4 address is generated in step S902. When the CPU 201 determines that the IPv6 address is enabled in step S901 (YES in step S901), the processing in step S902 is executed without the CPU 201 determining whether the IPv4 address is enabled.

Then, in step S903, the CPU 201 writes the tag information generated in step S902 into the NFC tag 212.

Next, step S904 is described. In step S904, the CPU 201 determines whether the IPv4 address is enabled in the printing device 100. When the CPU 201 determines that the IPv4 address is enabled in the printing device 100 (YES in step S904), the processing proceeds to step S905. On the other hand, when the CPU 201 determines that the IPv4 address is not enabled in the printing device 100 (NO in step S904), the processing proceeds to step S906.

In step S905, the CPU 201 generates the tag information including the IPv4 address. The tag information generated in step S905 is the tag information 600 described with reference to FIG. 6A. In step S903, the CPU 201 writes the tag information 600 generated in step S905 into the NFC tag 212.

Processing in step S906 is similar to that in step S708 described with reference to FIG. 7, and thus will not be described in detail.

In the present exemplary embodiment, the tag information 600 including the IPv4 address is written into the NFC tag 212 when only the IPv4 address is enabled in the printing device 100. The tag information 610 including the IPv6 address is written into the NFC tag 212 when only the IPv6 address is enabled in the printing device 100 or when both the IPv4 address and the IPv6 address are enabled in the printing device 100.

A fourth exemplary embodiment is described below. In many cases, the mobile terminal 130 or an application to be installed in the mobile terminal 130 is compatible with the IPv4 address but is not compatible with the IPv6 address. Accordingly, a feature of the present exemplary embodiment is that when the IPv4 address is not enabled and the IPv6 address is enabled in the printing device 100, appropriate tag information, taking into consideration of a communication partner not compatible with the IPv6 address, is written into the NFC tag 212. The configuration of the printing device 100 is similar to that in the first exemplary embodiment. In the present exemplary embodiment, the printing device 100 involves no setting described with reference to the setting screen 500 illustrated in FIG. 5.

Figure 10:
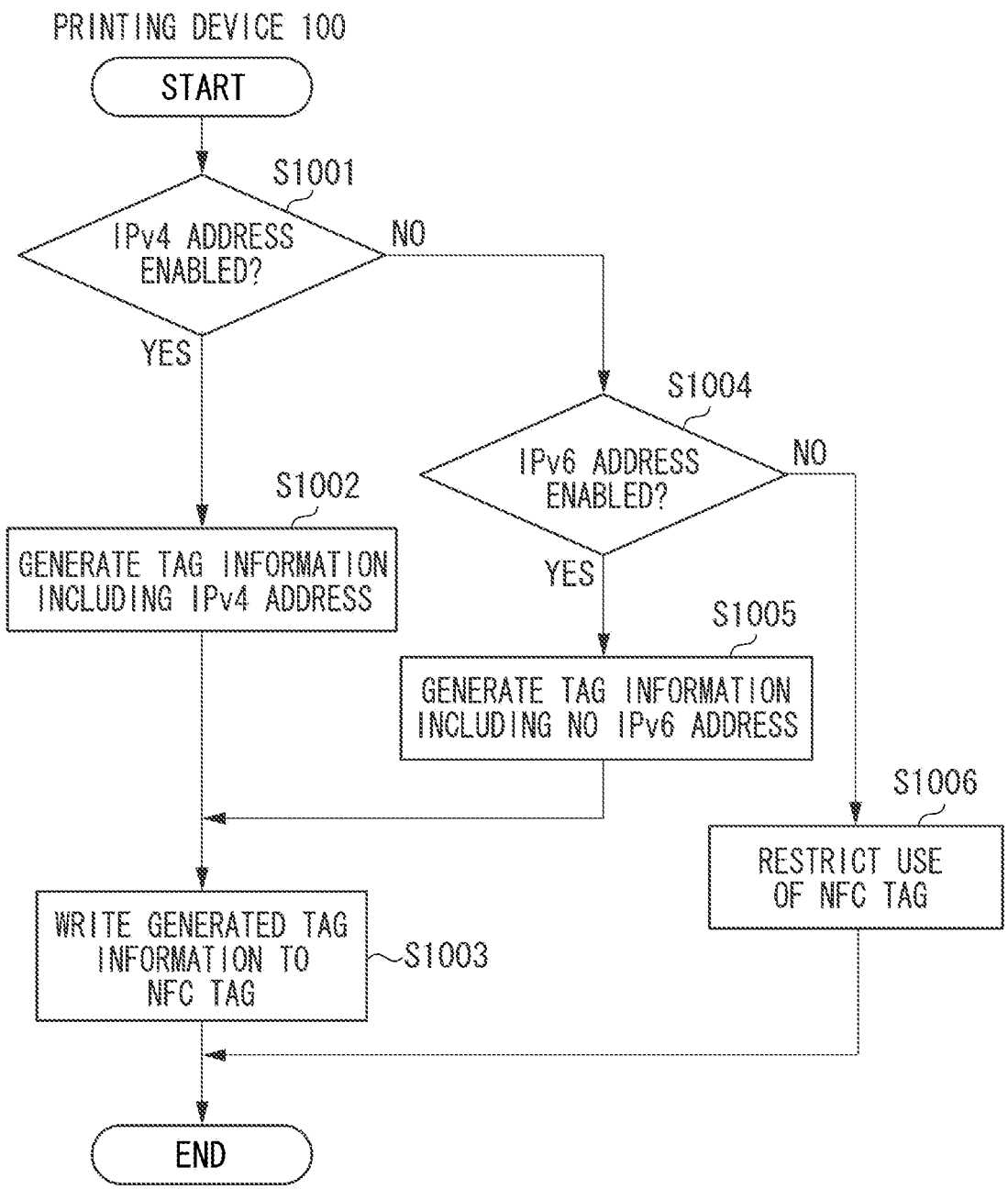
FIG. 10 is a flowchart illustrating processing according to a fourth exemplary embodiment.

Processing in which the printing device 100 generates tag information and writes the generated tag information into the NFC tag 212 is described with reference to a flowchart illustrated in FIG. 10. Each step in the flowchart illustrated in FIG. 10 is executed by the CPU 201 loading the control program stored in the memory, such as the ROM 202, onto the RAM 203 and executing the control program. The processing illustrated in the flowchart illustrated in FIG. 10 is executed as initial processing executed when the printing device 100 is turned ON, or executed when the IP address setting in the printing device 100 is changed via the setting screen 400 and the setting screen 410.

In step S1001, the CPU 201 determines whether the IPv4 address is enabled in the printing device 100. When the CPU 201 determines that the IPv4 address is enabled in the printing device 100 (YES in step S1001), the processing proceeds to step S1002. On the other hand, when the CPU 201 determines that the IPv4 address is not enabled in the printing device 100 (NO in step S1001), the processing proceeds to step S1004.

In step S1002, the CPU 201 generates the tag information including the IPv4 address. The tag information generated in step S1002 is the tag information 600 described with reference to FIG. 6A. In the present exemplary embodiment, also when both the IPv4 address and the IPv6 address are enabled in the printing device 100, the tag information 600 including no IPv6 address is generated in step S1002. When the CPU 201 determines that the IPv4 address is enabled in the printing device 100 in step S1001 (YES in step S1001), the processing in step S1002 is executed without the CPU 201 determining whether the IPv6 address is enabled.

Then, in step S1003, the CPU 201 writes the tag information 600 generated in step S1002 into the NFC tag 212.

Next, step S1004 is described. In step S1004, the CPU 201 determines whether the IPv6 address is enabled in the printing device 100. When the CPU 201 determines that the IPv6 address is enabled in the printing device 100 (YES in step S1004), the processing proceeds to step S1005. On the other hand, when the CPU 201 determines that the IPv6 address is not enabled in the printing device 100 (NO in step S1004), the processing proceeds to step S1006. Processing in step S1006 is similar to that in step S708 in FIG. 7, and thus will not be described.

Step S1005 is described. Processing in step S1005 is executed when the IPv4 address is not enabled and the IPv6 address is enabled in the printing device 100. When information including the IPv6 address such as the tag information 610 is written into the NFC tag 212, the mobile terminal 130 or the application installed in the mobile terminal 130 might not be compatible with the IPv6 address. Then, in the present exemplary embodiment, in step S1005, the CPU 201 generates tag information including no IPv6 address.

Figure 11:
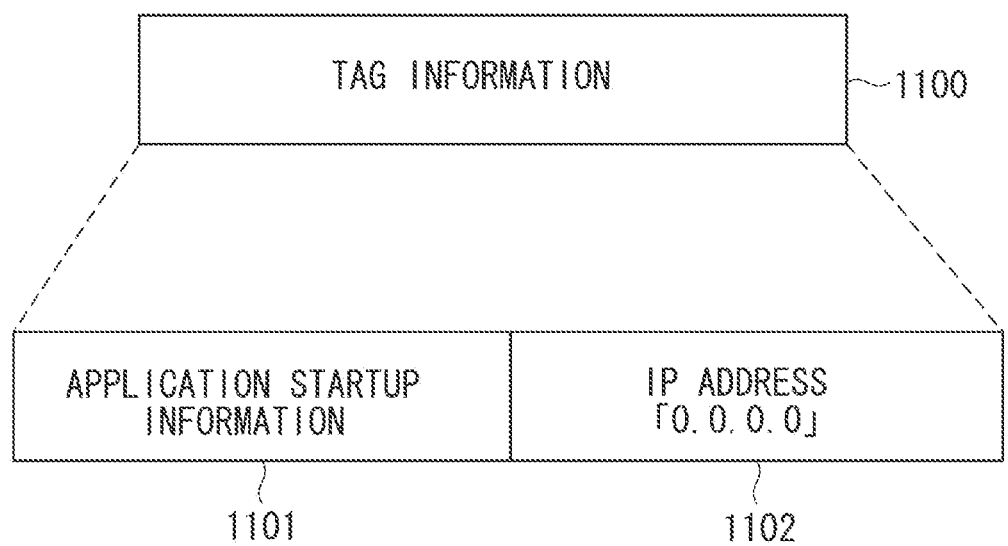
FIG. 11 is a diagram illustrating a configuration of tag information.

A configuration of the tag information generated by the CPU 201 in step S1005 is described with reference to FIG. 11. Tag information 1100 illustrated in FIG. 11 is in a format known as NDEF defined by the NFC forum as in the case of the tag information described with reference to FIGS. 6A and 6B. Application startup information 1101 is information for stating a predetermined application in the mobile terminal 130 that has read the tag information 1100, as in the case of the application startup information described with reference to FIGS. 6A and 6B. An IP address 1102 includes an address "0.0.0.0" instead of the IPv6 address of the printing device 100. In the present exemplary embodiment, "0.0.0.0" is included as a provisional IP address, because an IP address needs to be included in the tag information. When no IP address needs to be included in the tag information, the tag information 1100 may not include the IP address and include only the application startup information 1101.

The mobile terminal 130 that has read the tag information 1100 cannot identify the communication partner because the IP address included in the tag information 1100 is "0.0.0.0", but can start up the predetermined application according to the application startup information 1101. Since the predetermined application corresponding to the printing device 100 automatically starts, the user can immediately perform a subsequent action such as searching for an alternative printing device through the application for example.

A fifth exemplary embodiment is described below. In the configuration described in the fourth exemplary embodiment, the tag information 1100 including no IPv6 address is written into the NFC tag 212 when the IPv4 address is not enabled and the IPv6 address is enabled in the printing device 100. In a configuration described in the present exemplary embodiment, the use of the NFC tag 212 is restricted when the IPv4 address is not enabled and the IPv6 address is enabled in the printing device 100. The configuration of the printing device 100 is similar to that in the first exemplary embodiment. In the present exemplary embodiment, the printing device 100 involves no setting described with reference to the setting screen 500 illustrated in FIG. 5.

Processing in which the printing device 100 generates tag information and writes the generated tag information into the NFC tag 212 is described with reference to a flowchart illustrated in FIG. 12. Each step in the flowchart illustrated in FIG. 12 is executed by the CPU 201 loading the control program stored in the memory, such as the ROM 202, onto the RAM 203 and executing the control program. The processing illustrated in the flowchart illustrated in FIG. 12 is executed as initial processing executed when the printing device 100 is turned ON, or executed when the IP address setting in the printing device 100 is changed via the setting screen 400 and the setting screen 410.

In step S1201, the CPU 201 determines whether the IPv4 address is enabled in the printing device 100. When the CPU 201 determines that the IPv4 address is enabled in the printing device 100 (YES in step S1201), the processing proceeds to step S1202. On the other hand, when the CPU 201 determines that the IPv4 address is not enabled in the printing device 100 (NO in step S1201), the processing proceeds to step S1204.

In step S1202, the CPU 201 generates the tag information including the IPv4 address. The tag information generated in step S1202 is the tag information 600 described with reference to FIG. 6A. In the present exemplary embodiment, also when both the IPv4 address and the IPv6 address are enabled in the printing device 100, the tag information 600 including no IPv6 address is generated in step S1202. When the CPU 201 determines that the IPv4 address is enabled in step S1201 (YES in step S1201), the processing in step S1202 is executed with the CPU 201 not determining whether the IPv6 address is enabled.

Then, in step S1203, the CPU 201 writes the tag information 600 generated in step S1202 into the NFC tag 212.

Next, step S1204 is described. In step S1204, the CPU 201 restricts the use of the NFC tag 212. Processing in step S1204 is executed when the IPv4 address is not enabled and the IPv6 address is enabled in the printing device 100 or when neither the IPv4 address nor the IPv6 address is enabled in the printing device 100. In step S1204, the CPU 201 restricts the use of the NFC tag 212 by stopping the power supply to the NFC tag 212, so that the NFC tag 212 can no longer operate. In such a case, nothing occurs when the user touches the NFC tag 212 with the mobile terminal 130, so that the use of the NFC tag 212 is restricted. Alternatively, in step S204, the CPU 201 may restrict the use of the NFC tag 212 by writing no information to the memory 303 of the NFC tag 212 (and by deleting information that has been written). In such a case, no information can be read from the NFC tag 212 even when the user touches the NFC tag 212 with the mobile terminal 130, so that the use of the NFC tag 212 is restricted.

As described above, in the present exemplary embodiment, the use of the NFC tag 212 can be restricted when the IPv4 address is not enabled and the IPv6 address is enabled in the printing device 100.

Other Exemplary Embodiments

In the exemplary embodiments described above, the proximity wireless communication executed by the printing device 100 is described with the NFC as an example. Alternatively, other wireless communication (e.g., Bluetooth (registered trademark)) may be employed.

In the configurations described in the exemplary embodiments described above, the CPU 201 writes the tag information into the NFC tag 212. Alternatively, other configurations may be employed. More specifically, the CPU 201 may instruct a sub CPU (e.g., a sub CPU provided to the operation unit 211) to write the tag information, and the instructed sub CPU may write the tag information into the NFC tag 212.

Aspects of the present invention may be implemented through processing in which a program that implements at least one of the functions of the exemplary embodiments described above is supplied to a system or an apparatus via a network or a storage medium, and at least one processor in a computer of the system or the apparatus reads out and executes the program. Furthermore, aspects of the present invention can be implemented by a circuit (e.g., an application specific integrated circuit (ASIC)) that implements at least one of the functions.

According to aspects of the present invention, appropriate information can be written into a proximity wireless communication tag based on a type of an IP address of an information processing apparatus.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. An information processing apparatus configured to support communication using an Internet Protocol version 4 (IPv4) address and communication using an Internet Protocol version 6 (IPv6) address, the information processing apparatus comprising:
    a first network interface that transmits data using a short-range wireless communication method;
    a second network interface;
    at least one memory that stores a set of instruction; and
    at least one processor that executes the set of instructions, which, when executed, causes the information processing apparatus to perform operations comprising:
    generating data including an IPv4 address assigned to the information processing apparatus but not including an IPv6 address, and
    controlling to provide, via the first network interface, the generated data including an IPv4 address assigned to the information processing apparatus but not including an IPv6 address, at least in a case where both the IPv4 address and the IPv6 address are assigned to the information processing apparatus as an IP address for communicating with an outside apparatus via the second network interface.

2. The information processing apparatus according to claim 1, wherein the information processing apparatus is a printing device that executes print processing.

3. The information processing apparatus according to claim 1, wherein the operations further comprise:
    controlling to generate data including a provisional IP address but not including the assigned IPv6 address of the information processing apparatus, in a case where the IPv4 address is not assigned to the information processing apparatus and the IPv6 address is assigned to the information processing apparatus; and
    controlling to provide, via the first network interface, the generated data including an IPv4 address assigned to the information processing apparatus but not including an IPv6 address, at least in a case where the IPv4 address is not assigned to the information processing apparatus and the IPv6 address is assigned to the information processing apparatus.

4. The information processing apparatus according to claim 3, wherein the provisional IP address is "0.0.0.0".

5. The information processing apparatus according to claim 1, wherein the short-range wireless communication method is a near field communication (NFC) method.

6. The information processing apparatus according to claim 1, wherein the first network interface is a NFC tag having a memory.

7. The information processing apparatus according to claim 1, wherein the operations further comprise controlling to generate second data indicating starting information for causing an external apparatus to start a predetermined application, and
    wherein the generated data and the generated second data are provided to the external device via the first network interface.

8. A method of an information processing apparatus, the information processing apparatus configured to support communication using an Internet Protocol version 4 (IPv4) address and communication using an Internet Protocol version 6 (IPv6) address, wherein the information processing apparatus has a first network interface that transmits data using a short-range wireless communication method, and a second network interface, the method comprising:

generating data including an IPv4 address assigned to the information processing apparatus but not including an IPv6 address, and controlling to provide, via the first network interface, the generated data including an IPv4 address assigned to the information processing apparatus but not including an IPv6 address, at least in a case where both the IPv4 address and the IPv6 address are assigned to the information processing apparatus as an IP address for communicating with an outside apparatus via the second network interface.

9. The method according to claim 8, wherein the information processing apparatus is a printing device that executes print processing.

10. The method according to claim 8, further comprising:

controlling to generate data including a provisional IP address but not including the assigned IPv6 address of the information processing apparatus, in a case where the IPv4 address is not assigned to the information processing apparatus and the IPv6 address is assigned to the information processing apparatus; and controlling to provide the generated data including an IPv4 address assigned to the information processing apparatus but not including an IPv6 address via the first network interface, at least in a case where the IPv4 address is not assigned to the information processing apparatus and the IPv6 address is assigned to the information processing apparatus.

11. The method according to claim 10, wherein the provisional IP address is "0.0.0.0".

12. The method according to claim 8, wherein the short-range wireless communication method is a near field communication (NFC) method.

13. The method according to claim 8, wherein the first network interface is a NFC tag having a memory.

14. The method according to claim 8, further comprising controlling to generate second data indicating starting information for causing an external apparatus to start a predetermined application, wherein the generated data and the generated second data are provided to the external device via the first network interface.

15. A non-transitory computer readable storage medium for causing an information processing apparatus to perform a process, the information processing apparatus configured to support communication using an Internet Protocol version 4 (IPv4) address and communication using an Internet Protocol version 6 (IPv6) address, wherein the information processing apparatus has a first network interface that transmits data using a short-range wireless communication method, and a second network interface, the process comprising:

generating data including an IPv4 address assigned to the information processing apparatus but not including an IPv6 address, and controlling to provide, via the first network interface, the generated data including an IPv4 address assigned to the information processing apparatus but not including an IPv6 address, at least in a case where both the IPv4 address and the IPv6 address are assigned to the information processing apparatus as an IP address for communicating with an outside apparatus via the second network interface.

* * * * *